(12) United States Patent
Nguyen et al.

(10) Patent No.: US 10,701,495 B2
(45) Date of Patent: Jun. 30, 2020

(54) EXTERNAL DEVICE LEVERAGED HEARING ASSISTANCE AND NOISE SUPPRESSION DEVICE, METHOD AND SYSTEMS

(71) Applicants: The Regents of the University of California, Oakland, CA (US); San Diego State University Research Foundation, San Diego, CA (US)

(72) Inventors: Truong Nguyen, San Diego, CA (US); Harinath Garudadri, San Diego, CA (US); Patrick Mercier, San Diego, CA (US); Arthur Boothroyd, San Diego, CA (US); Carol Mackersie, San Diego, CA (US)

(*) Notice: Subject to any disclaimer, the term of this patent is extended or adjusted under 35 U.S.C. 154(b) by 289 days.

(21) Appl. No.: 15/502,130

(22) PCT Filed: Aug. 7, 2015

(86) PCT No.: PCT/US2015/044184
§ 371 (c)(1),
(2) Date: Feb. 6, 2017

(87) PCT Pub. No.: WO2016/022905
PCT Pub. Date: Feb. 11, 2016

(65) Prior Publication Data
US 2017/0230769 A1    Aug. 10, 2017

Related U.S. Application Data

(60) Provisional application No. 62/034,919, filed on Aug. 8, 2014.

(51) Int. Cl.
*H04R 25/00* (2006.01)
*H04M 1/60* (2006.01)

(52) U.S. Cl.
CPC ......... *H04R 25/558* (2013.01); *H04R 25/305* (2013.01); *H04R 25/70* (2013.01);
(Continued)

(58) Field of Classification Search
CPC .... H04R 25/70; H04R 25/305; H04R 25/405; H04R 25/552; H04R 25/554;
(Continued)

(56) References Cited

U.S. PATENT DOCUMENTS 5,721,783 A    2/1998    Anderson
6,118,877 A    9/2000    Lindemann
(Continued)

OTHER PUBLICATIONS

Boatman, D.F., et al., "How accurate are bedside hearing tests?", Neurology, vol. 68, (2007), pp. 1311-1314.
(Continued)

*Primary Examiner* — Xu Mei
(74) *Attorney, Agent, or Firm* — Greer, Burns & Crain, Ltd.; Steven P. Fallon

(57) ABSTRACT

A hearing assistance and/or noise suppression device leverages computing power of an external device with a digital signal processor, such as a special unit that is configured to communicate with a smart device (e.g., a smart phone, smart watch or smart pendant) or a smart phone with a digital signal processor. Methods include having a hearing transducer communicate with and offload computing tasks to an external device with a digital signal processor. Systems include a hearing transducer with transducer circuitry that receives, amplifies and outputs digital signal processed audio from another device. Methods provide self-adjustment and fitting through a touch screen interface, which can be conducted outside of a clinical setting in a real world environment, and method can include remote data collection and communications with clinicians.

19 Claims, 13 Drawing Sheets

(52) U.S. Cl.
CPC ......... *H04M 1/6066* (2013.01); *H04R 25/405* (2013.01); *H04R 25/552* (2013.01); *H04R 25/554* (2013.01); *H04R 2225/41* (2013.01); *H04R 2225/43* (2013.01); *H04R 2420/07* (2013.01); *H04R 2430/03* (2013.01)

(58) Field of Classification Search
CPC .............. H04R 25/558; H04R 2225/41; H04R 2225/43; H04R 2420/07; H04R 2430/03
USPC ........................ 381/74, 60, 312–321, 26, 311
See application file for complete search history.

(56) References Cited

U.S. PATENT DOCUMENTS

| | | | | |
|---|---|---|---|---|
| 8,842,860 | B2 * | 9/2014 | Jang | H04R 25/00 |
| | | | | 381/120 |
| 8,885,857 | B2 * | 11/2014 | Rank | H04R 25/554 |
| | | | | 381/312 |
| 8,891,793 | B1 * | 11/2014 | Sacha | H04R 25/558 |
| | | | | 381/312 |
| 2014/0198918 | A1 | 7/2014 | Li et al. | |

OTHER PUBLICATIONS

Collins, JG., "Prevalence of Selected Chronic Conditions: United States, 1990-92", Vital and Health Statistics, From the Centers for Disease Control and Prevention / National Center for Health Statistics, U.S. Department of Health and Human Services, Series 10, No. 194, (Jan. 1997), (98 pages).

Kaufmann, Marcelo, A., et al., "Response to: How accurate are bedside hearing tests?", Neurology, vol. 69, (2007), pp. 1382.

Kochkin, Sergei, "MarkeTrak V: "Why my hearing aids are in the drawer": The consumers' perspective", The Hearing Journal, vol. 53, No. 2, (Feb. 2000), pp. 34-41.

Kochkin, Sergei, "MarkeTrak VIII: Consumer satisfaction with hearing aids is slowly increasing", The Hearing Journal, vol. 63, No. 1, (Jan. 2010), pp. 19-27.

U.S. Department of Health & Human Services, National Institutes of Health, National Institute on Deafness and Other Communication Disorders (NIDCD), "NIDCD Working Group on Accessible and Affordable Hearing Health Care for Adults with Mild to Moderate Hearing Loss", Aug. 25-27, 2009, Bethesda, Maryland, (13 pages).

Thomas, Shane, "Notification of Transmittal of the International Search Report and the Written Opinion of the International Searching Authority, or the Declaration", Patent Cooperation Treaty Application No. PCT/US2015/044184, United States as the International Searching Authority, International Search Completed Dec. 3, 2015, International Search Report dated Dec. 30, 2015, (11 pages).

* cited by examiner

| # | Date | Time | LF | Vol | HF | Histo | Secs | Aided | SNR | slfscr | Nons | Set | Wrds | % | Note |
|---|---|---|---|---|---|---|---|---|---|---|---|---|---|---|---|
| 1 | 10/30/20 | 3:04pm | 3 | 7 | 2 | 76 | 179 | | | | | | | | |
| 2 | 10/30/20 | 3:06pm | 3 | 7 | 2 | -76 | 99 | Y | 30 | N | N | 3 | 26 | 65 | --- |
| 3 | 10/30/20 | 3:08pm | 3 | 7 | 2 | -76 | 69 | Y | 30 | N | N | 5 | 26 | 65 | --- |
| 4 | 10/30/20 | 3:10pm | 3 | 7 | 2 | -76 | 84 | Y | 30 | N | N | 6 | 26 | 65 | --- |
| 5 | 10/30/20 | 3:12pm | 4 | 5 | 1 | -73 | 101 | N | 30 | N | N | 8 | 20 | 50 | got_when_after_thinking |
| 6 | 10/30/20 | 3:14pm | 3 | 9 | 4 | 76 | 101 | | | | | | | | |
| 7 | 10/30/20 | 3:15pm | 3 | 9 | 4 | -76 | 62 | Y | 30 | N | N | 10 | 34 | 85 | --- |
| 8 | 10/30/20 | 3:17pm | 3 | 9 | 4 | -76 | 62 | Y | 30 | N | N | 9 | 32 | 80 | --- |

Correct words are in boldface

| 1 | 2 | 3 | 4 | 5 | 6 | 7 | 8 | 9 | 10 |
|---|---|---|---|---|---|---|---|---|---|
| blue | ducks | dark | thieves | lakes | smart | cars | take | these | let's |
| whales | need | clouds | steal | hold | kids | skid | clear | ticks | pay |
| are | webbed | bring | our | large | learn | on | class | suck | cash |
| huge | feet | rain | things | fish | fast | ice | notes | blood | now |

Note: ---
Word score 80%    Sentence score 60%    j-factor 2.3

FIG. 9B

| Subject | Age (yrs) | Gender | Test ear | Pure-tone thresholds (dB HL) ||||||||||| 
| | | | | Right Ear ||||| | Left Ear |||||
| | | | | Frequency (Hz) ||||| | Frequency (Hz) |||||
| | | | | 250 | 500 | 1000 | 2000 | 4000 | 8000 | 250 | 500 | 1000 | 2000 | 4000 | 8000 |
|---|---|---|---|---|---|---|---|---|---|---|---|---|---|---|---|
| S01 | 82 | F | L | 25 | 25 | 35 | 35 | 45 | 70 | 35 | 30 | 35 | 60 | 70 | 85 |
| S02 | 73 | M | L | 50 | 50 | 60 | 70 | 75 | 80 | 45 | 45 | 55 | 70 | 75 | 90 |
| S03 | 76 | F | R | 45 | 45 | 55 | 80 | 60 | 65 | 40 | 55 | 60 | 60 | 70 | 65 |
| S04 | 78 | F | L | 50 | 45 | 50 | 60 | 55 | 50 | 30 | 40 | 40 | 45 | 45 | 50 |
| S05 | 66 | M | L | 25 | 40 | 60 | 70 | 75 | >110 | 30 | 35 | 40 | 65 | 80 | >110 |

FIG. 11

|  |  |  | S01 | S02 | S03 | S04 | S05 | Mean | std.err |
|---|---|---|---|---|---|---|---|---|---|
| Session 1 | Self-adjust-ment | LF-cut dB | -6 | 0 | -6 | -6 | -6 | -4.5 | 1.5 |
|  |  | Gain dB | 11 | 33 | 25 | 20 | 25 | 22.8 | 3.6 |
|  |  | HF-boost dB | 6 | 18 | 18 | 6 | 12 | 12 | 2.7 |
|  |  | time (m:s) | 2:59 | 1:19 | 2:12 | 0:22 | 0:55 | 1:33 | :28 |
|  | Word recog-nition | Aided % | 65 | 95 | 95 | 93 | 93 | 88.2 | 5.8 |
|  |  | std.err. %pt | 6.2 | 3.4 | 3.4 | 3.2 | 3.2 |  |  |
|  |  | Unaided % | 32.5 | 80 | 86.5 | 22.5 | 10 | 46.3 | 15.5 |
|  |  | std.err. %pt | 8.8 | 7.3 | 6.6 | 5.9 | 5.6 |  |  |
|  | HA benefit | Diff. %pt | 10 | 87.5 | 87.5 | 18 | 9 | 42.4 | 18.5 |
|  |  | std.err. %pt | 8.9 | 6.8 | 6.8 | 6.4 | 5.7 |  |  |
| Session 2 | Self-adjust-ment | LF-cut dB | -6 | -6 | 0 | -6 | -12 | -6 | 3.5 |
|  |  | Gain dB | 19 | 37 | 29 | 24 | 33 | 28.4 | 3.2 |
|  |  | HF-boost dB | 18 | 18 | 18 | 6 | 18 | 15.6 | 2.4 |
|  |  | time (m:s) | 1:41 | 1:20 | 2:44 | 0:45 | 0:38 | 1:26 | :23 |
|  | Word recog-nition | Aided % | 82.5 | 87.5 | 94 | 97.5 | 94 | 91.1 | 2.7 |
|  |  | std.err. %pt | 6 | 4.3 | 3 | 2 | 3 |  |  |
|  |  | Unaided % | 55 | 7.5 | 7.5 | 75 | 84 | 45.8 | 16.3 |
|  |  | std.err. %pt | 6.4 | 5.9 | 5.9 | 5.6 | 4.7 |  |  |
|  | HA benefit | Diff. %pt | 32.5 | 80 | 86.5 | 22.5 | 10 | 46.3 | 15.5 |
|  |  | std.err. %pt | 8.8 | 7.3 | 6.6 | 5.9 | 5.6 |  |  |

FIG. 12

EXTERNAL DEVICE LEVERAGED HEARING ASSISTANCE AND NOISE SUPPRESSION DEVICE, METHOD AND SYSTEMS

PRIORITY CLAIM AND REFERENCE TO RELATED APPLICATION

The application claims priority under 35 U.S.C. § 119 and all applicable statutes and treaties from prior provisional application Ser. No. 62/034,919, which was filed Aug. 8, 2014.

FIELD

A field of the invention is hearing assistance devices and noise suppression devices.

BACKGROUND

A pair of hearing-aids can range in cost from $1800 to $6,800 and generally last 4-6 years. The cost of ownership including batteries and maintenance can add further expense over the hearing-aid's lifetime. For many Americans with HL, hearing-aids can be the 3rd most expensive item, after their home and car. The hearing-aid device itself is relatively inexpensive to manufacture, but typical fitting procedures add expense and inconvenience.

Despite expert efforts at fitting and adjustment, many users are unsatisfied with device performance at various times during real-world use of a device. User satisfaction is affected by speech quality, clarity of sound, natural sound, richness/fidelity of sound, comfort with loud sounds, and sound of own voice (occlusion). While recent advances have made fewer hearing-aids end up "in the drawer", there remains a small percentage of patients who are "satisfied" or "very satisfied". Reasons for this level of dissatisfaction have been identified for more than a decade. See, Kochkin, S., "MarkeTrak V: 'Why my hearing-aids are in the drawer': The consumers' perspective, The Hearing Journal, Vol. 55, No. 2 pp. 34-41 (February 2000). Kochkin's report identified the poor performance of hearing-aids in providing clarity in noisy environments as being a primary factor for the hearing-aids to end up "in the drawer," i.e., not used. The user determines that too little benefit is provided to warrant use of the hearing-aid. The solution proposed in the Kochkin article to address the clarity issue included multiple-microphone hearing-aids that allow the user to choose between omnidirectional and unidirectional modes.

The basic problem is that a hearing-aid's output is being received by a damaged inner ear. A consequence of the damage is that noise has a greater effect on speech perception than it does for undamaged ears. Some prior solutions include use of a wireless microphone for the talker of interest (highly effective, but impractical). directional (or beam-forming) microphones aimed at the talker of interest (somewhat effective but less so in many real-world environments where the directional sound is less important than reflected sounds), and noise "reduction" (effective in reducing perceived "noisiness" and reducing listening effort but not in improving speech recognition).

FIGS. 1A and 1B respectively illustrate the left and right hearing-aid components of a conventional modern hearing-aid. The power amplifier (PA) and pre-amp are analog components. A speaker provides a signal to the PA, which is then converted by an analog to digital converters (ADC) and then processed by a digital signal processor (DSP). The DSP processes the signal to enhance clarity and filter noise. A conditioned signal is output and converted by a digital to analog converter (DAC). The analog output is amplified and an auditory signal is output by a speaker. Typical current consumption is about 1 mA, with 700 μA for the DSP. The analog to digital convertor (ADC) and the digital to analog convertor (DAC) typically operate at 16 kHz sampling, providing at most 8 kHz bandwidth for the audio path. There is negligible speech information at frequencies above 8 kHz. However, people with normal hearing may benefit in terms of sound quality and perceiving sound direction and localization with signals that extend above that range. Some emerging hearing-aids provide digital wireless transmission using radios such as Bluetooth. These wireless links support speech and audio path to off-body devices such as smartphones, but compensation is still implemented on the local DSP with limited power budget. Radios such as Bluetooth support multiple applications and consequently are not "power" optimized for hearing-aid functionalities. The current consumption of state-of-the art radios can be as high as 10 mA.

Noise suppression is also of interest to users having normal hearing. For example, hearing protection is worn by users in various environments, such as military and industrial environments. A standard approach is to wear protection that attenuates all acoustic sources. Such users could benefit from selective noise suppression.

SUMMARY OF THE INVENTION

A preferred embodiment is a hearing transducer device including a housing configured to fit on or around a user's ear. The device includes, accommodated within the housing, the following: a power source; an amplifier for amplifying a processed signal; a speaker for outputting an amplified processed signal from the amplifier; and an interface to communicate with an external device having a digital signal processor. The interface receives a signal obtained by an acoustic sensor and processed by the digital signal processor of the external device to produce an enhanced audio signal, and provides the enhanced audio signal to the amplifier for output by the speaker.

A preferred hearing-aid system includes a first device with at least one microphone and at least one receiver. The first device includes at least one pre-amplifier connected to the at least one microphone; one modulator connected to the at least one pre-amplifier; one transducer connected to the output of each modulator; one power amplifier provisioned to drive at least one receiver; each power amplifier provisioned to receive demodulator output; each demodulator provisioned to receive bandpass filter output; each bandpass filter provisioned to receive transducer output. The system includes a second device external to the first device with at least one ADC (analog to digital converter), at least one digital signal processor, at least one DAC (digital to analog converter) and at least one modem. The second device includes one transducer connected at least one bandpass filter; one bandpass filter connected to at least one demodulator; one ADC connected to at least one demodulator; the one DSP connected to at least one ADC and one DAC; at least one DAC provisioned to receive input from the said DSP; at least one modulator provisioned to receive input from each DAC; at least one transducer provisioned to receive the input from the modulator. The first device modulates at least one microphone signal on to the RF channel, the second device demodulates at least one signal from the RF channel, the said second device further processes at least one demodulated signal, the second device modulates the said processed signal on the RF channel, and the first device demodulates at least one signal from the RF channel and renders the signal on the receiver.

A preferred method for hearing correction includes receiving acoustic stimuli. The acoustic stimuli are provided to a device external from a hearing-aid device worn by a user on or in the user's ear. Digital signal processing enhances the acoustic stimuli according to a profile for the user to produce enhanced audio stimuli. The enhanced audio stimuli are transmitted to the hearing-aid device. The enhanced audio stimuli are output through a transducer of the hearing-aid device.

A preferred method for self-adjustment of a hearing-aid or noise suppression device includes presenting an interface to a user on a touch screen while the user is outside of a clinical setting in a real world usage setting. Input is accepted from the touch screen. Settings of a digital signal processor that processes incoming acoustic signals are adjusted in response to the input to selectively alter audio characteristics of the incoming acoustic signal to provide hearing assistance or noise suppression.

BRIEF DESCRIPTION OF THE DRAWINGS

FIGS. 9A and 9B illustrate data results obtained via simulation of a self-fitting process of a preferred system of the invention;

FIG. 11 illustrates experimental self-fitting results by five subjects that conducted self-fitting testing that simulated a preferred system of the invention; and FIG. 12 illustrates experimental final self-fitting amplification parameter results by the five subjects that conducted self-fitting testing that simulated a preferred system of the invention.

DESCRIPTION OF THE PREFERRED EMBODIMENTS

Figure 1B:
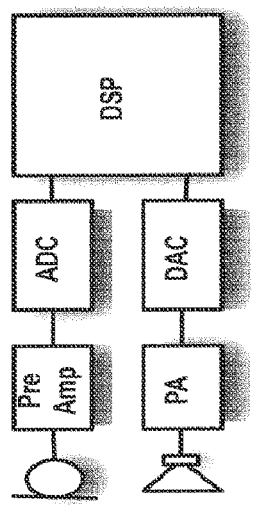
FIGS. 1A and 1B are block diagrams of a conventional hearing-aid system including right and left hearing-aids.
Figure 1A:
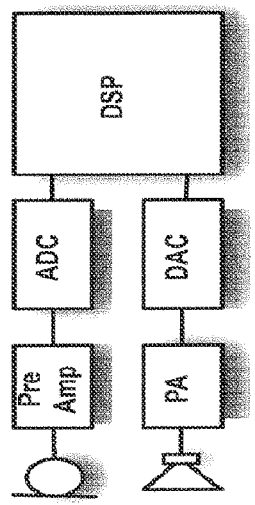

The inventors have recognized that limits on the current consumption of the DSP in state of the art hearing-aids and hearing-aid systems greatly limit potential performance. The inventors have also determined that present hearing-aids and hearing-aid systems with on-board digital signal processing inherently have a limited capability to address multiple listening environments that have diverse types of noise and interference to address. The currently technology is also poorly suited for field testing, self-fitting, remote assistance from experts, e.g. audiologists, etc. The present inventors have recognized that additional benefits could be provided by a hearing-aid and hearing-aid systems that enabled field testing, self-fitting, remote assistance from experts, e.g. audiologists, etc. The present inventors have also recognized that self-testing should be guided to enhance objective speech perception instead of user subjective reaction to sound comfort and quality. The present inventors have also recognized that real world fitting and adjustment can selectively suppress particular sources, and separate foreground and background sources, for example.

An embodiment of the invention is a hearing transducer that leverages computing power of an external device with a digital signal processor, such as a special unit that is configured to communicate with a smart device (e.g., a smart phone, smart watch or smart pendant) or a smart phone with a digital signal processor. Methods of the invention include having a hearing-aid communicate and offload computing tasks to an external device with a digital signal processor. Methods and hearing transducer devices leverage large batteries and sophisticated on-board DSP (digital signal processors) of smart mobile devices to execute complex signal processing algorithms. A system of the invention includes a hearing transducer and mobile device software that conduct audio signal processing operations on the mobile device. Systems of the invention can provide sophisticated signal processing and provide improved and adaptive signal processing that are not feasible in conventional on-board hearing-aid architectures. Preferred embodiments also include software stored on a non-transient medium in a mobile device, such as a smart phone. The software is configured to communicate with a hearing transducer and provide digital signal processing to enhance performance. Preferred embodiment software further provides interfaces for user interaction to perform testing, fitting, customized environment settings, and obtain assistance via communications with third parties, such as service providers and experts.

Systems of the invention can adapt to multiple and diverse listening environments. Systems of the invention permit field testing and leveraging data acquired from other users. Systems of the invention permit self-fitting of hearing-aid systems, and can provide remote assistance from experts, e.g. audiologists, based upon data provided.

In preferred embodiments the communication between the hearing transducer device and the mobile devices is wireless, such as via a Bluetooth connection. In other embodiments, a wired connection is used.

Preferred embodiments can provide low-cost hearing transducers that cooperate with software on a mobile device. An app on a device can provide self-fitting assistance to a user of the hearing-aid system. The system includes the hearing transducer, mobile device and mobile device software, and can provide high quality audio, the ability to combine multiple microphones for noise cancellation and signal processing purposes, and access to auxiliary audio sources, all through integration with existing mobile technology.

Preferred systems of the invention can off-load digital signal processing functionality to a smartphone or smart-watch platform through ultra-low-power, ultra-low-latency wireless streaming of high definition audio. The large batteries and sophisticated on-board DSP on such smart mobile devices are leveraged to execute complex signal processing algorithms that are not feasible in conventional hearing-aid architectures. Methods and systems of the invention can improve intelligibility in multiple environments through user interaction, multiple microphones, and remote expert assistance.

Many tests used in an audiology practice such as pure-tone thresholds and word recognition scores are amenable to administering on smart-phone platforms and save the results in the patient's electronic medical records. Preferred methods and software of the invention combine such tests directly with a constituent hearing-aid system and can also leverage consultation with a remote audiologist via app driven communications. Preferred systems and software apps can also conduct more extensive and accurate testing in real-usage conditions, thereby enhancing the user experience, while also reducing the overall cost of hearing-aid selection, acquisition, fitting, and maintenance.

Embodiments of the invention can improve user experience and provide high fidelity, field-testable, self-fitting hearing-aid and app systems to increase access to and satisfaction with hearing correction. Preferred systems can also improve current screening and fitting protocols and improve the quality and naturalness of sounds after compensating for hearing loss. Wireless links with ultra-low-power and ultra-low-latency that support CD quality streaming of speech and acoustic data sensed data from the hearing transducer to other devices with significantly more computational capabilities and network connectivity can provide much better and customizable performance than state of the art hearing-aid technology.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

The preferred embodiments can achieve low-cost, enable self-fitting operation, offers CD-quality audio, and the ability to combine multiple microphones for noise cancellation and signal processing purposes, and access to auxiliary audio sources, all through integration with existing mobile technology, preferably through wireless connection. Preferred systems of the invention off-load digital signal processing functionality to a smartphone or smart-watch platform through ultra-low-power, ultra-low-latency wireless streaming of high definition audio. The preferred methods can improve intelligibility in multiple environments through user interaction, multiple microphones, and remote expert assistance.

In preferred embodiments, the hearing transducer is a "light" component, including only analog circuitry necessary to sense acoustic signals, generate an audio signal and communicate through a communication medium. The hearing transducer benefits from signals provided by signal processing performed on a module separated from the ear and worn on the body, the pre-acoustic and post-processing audio signals being coded and transmitted from and back to ear-worn units with similar physical configuration to existing digital hearing-aids. Preferred embodiments can be constructed from components already developed for a mass market, thereby reducing cost and increasing accessibility to hearing health-care. Systems of the invention can replicate and possibly exceed the performance of current high-end hearing-aids but at a much reduced cost.

Preferred embodiments solve technical challenges and reduce end-user costs by moving signal processing from the ear-worn device into an external unit including a digital signal processor where considerations of size, battery drain, memory, and processing capacity are dramatically reduced. This external unit receives sound signals, preferably wirelessly, from ear-level microphones and/or microphones worn elsewhere or included on the external device and returns the processed sound signals, preferably wirelessly, to ear-level output transducers. The ear worn device retains a hearing-aid form factor, and additional real estate is made available by the removal of digital signal processing, permitting additional choices such as reducing the form factor, increasing battery size, or some combination of both. In preferred embodiments, the hearing transducer unit contains circuitry components consisting of the microphone with a preamplifier, an output transducer with power amplifier, and the necessary wireless or wired transmitter or receiver components.

The provision of digital signal processing on a unit that is separate from the ear worn hearing transducer device provides increased processing power that is leveraged from the external device, such as smartphone that includes a digital signal processor or a separate wearable device comprising a digital signal processor unit and communicates with a smart phone. This increased processing capacity of an external processing unit can be applied to self-fitting algorithms, scene recognition, user adjustments, assisted adjustments, data reporting to a clinician and other significant operations that can improve initial performance and allow the hearing-aid system to adjust over time to suit changed abilities of the user. Such operations enabled by preferred systems of the invention can greatly reduce the time required and according the cost of professional services in arriving at optimal amplification. In addition, the ability to adapt over time without the need for clinic visits can reduce costs and increase the likelihood that a user will be satisfied over time with the hearing-aid system and continue to use the hearing-aid system.

A preferred embodiment is a hearing transducer device including a housing configured to fit on or around a user's ear. The device includes, accommodated within the housing, the following: a power source; an amplifier for amplifying a processed signal; a speaker for outputting an amplified processed signal from the amplifier; and an interface to communicate with an external device having a digital signal processor. The interface receives a processed signal obtained by an acoustic sensor and processed by the digital signal processor of the external device and provides an enhanced audio signal to the amplifier for output by the speaker.

In preferred embodiments, the hearing transducer device consists of analog circuitry. In preferred embodiments, the device has no digital signal processor. In preferred embodiments, the interface is a wireless interface.

A preferred hearing-aid system includes such a hearing transducer device and an external device configured to be carried by the user and that provides the digital signal processor and an interface to communicate with the hearing transducer device and an acoustic sensor. The external device can be a smartphone, or in other embodiments, a stand alone unit worn on the body of the person to provide digital signal processing and having a communication interface to communicate with a smartphone, smart watch or smart pendant.

Such a smart device can include software to present a foreground acoustic source selection interface to the user. Such an acoustic source selection interface preferably includes a grid with representations of acoustic sources in a surrounding environment.

Such a smart device can also present a self-adjustment interface to the user. A preferred interface includes increase, attenuate or "OK" settings for a plurality of frequency bands.

A preferred hearing-aid system includes a first device with at least one microphone and at least one receiver. The first device includes at least one pre-amplifier connected to the at least one microphone; one modulator connected to the at least one pre-amplifier; one transducer connected to the output of each modulator; one power amplifier provisioned to drive at least one receiver; each power amplifier provisioned to receive demodulator output; each demodulator provisioned to receive bandpass filter output; each bandpass filter provisioned to receive transducer output. The system includes a second device external to the first device with at least one ADC (analog to digital converter), at least one digital signal processor, at least one DAC (digital to analog converter) and at least one modem. The second device includes one transducer connected at least one bandpass filter; one bandpass filter connected at least one demodulator; one ADC connected to at least one demodulator; the one DSP connected to at least one ADC and one DAC; at least one DAC provisioned to receive input from the said DSP; at least one modulator provisioned to receive input from each DAC; at least one transducer provisioned to receive the input from the modulator. The first device modulates at least one microphone signal on to the RF channel, the second device demodulates at least one signal from the RF channel, the said second device further processes at least one demodulated signal, the second device modulates the said processed signal on the RF channel, and the first device demodulates at least one signal from the RF channel and renders the signal on the receiver.

The second device preferably includes at least one DSP provisioned to perform 3D audio scene analysis, and/or to classify foreground and background sound classification to remix foreground and background sounds with different intensities, and/or to modify at least one foreground sound to compensate for a given hearing loss characteristic.

Preferably, the second device includes at least one wireless modem paired to at least one modem of a third device, wherein the third device is provisioned to connect to the Internet wirelessly.

In preferred systems, the second device includes at least one DSP (digital signal processor) provisioned to receive at least one hearing loss characteristic, corresponding to at least one listening environment from a third device.

In preferred systems, the second device is configured to render pure-tone audiometry stimuli in the first device and further includes or connects to another device to provide an interface to receive user input in response to the the stimuli.

In preferred systems, the system is configured to modify at least one hearing-loss characteristic based on at least one user response to at least one test stimulus.

In preferred systems, the at least one DSP (digital signal processor) in the second device is provisioned to receive sound signals from multiple sources and for mixing with foreground and background sounds.

In preferred systems, the second device comprises at least one DSP (digital signal processor) provisioned to turn off all sound delivery.

A preferred method for hearing assistance includes receiving acoustic stimuli. The audio stimuli are provided to a device external from a hearing transducer device worn by a user on or in the user's ear. Digital signal processing enhances the acoustic stimuli according to a profile for the user. The enhanced audio stimuli are transmitted to the hearing transducer device. The enhanced audio stimuli is output through a transducer of the hearing transducer device.

A preferred method for self-adjustment of a hearing assistance or noise suppression device includes presenting an interface to a user on a touch screen while the user is outside of a clinical setting in a real world usage setting. Input is accepted from the touch screen. Settings of a digital signal processor that processes incoming acoustic signals are adjusted in response to the input to selectively alter audio characteristics of the incoming signal to provide hearing assistance or noise suppression.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 2:
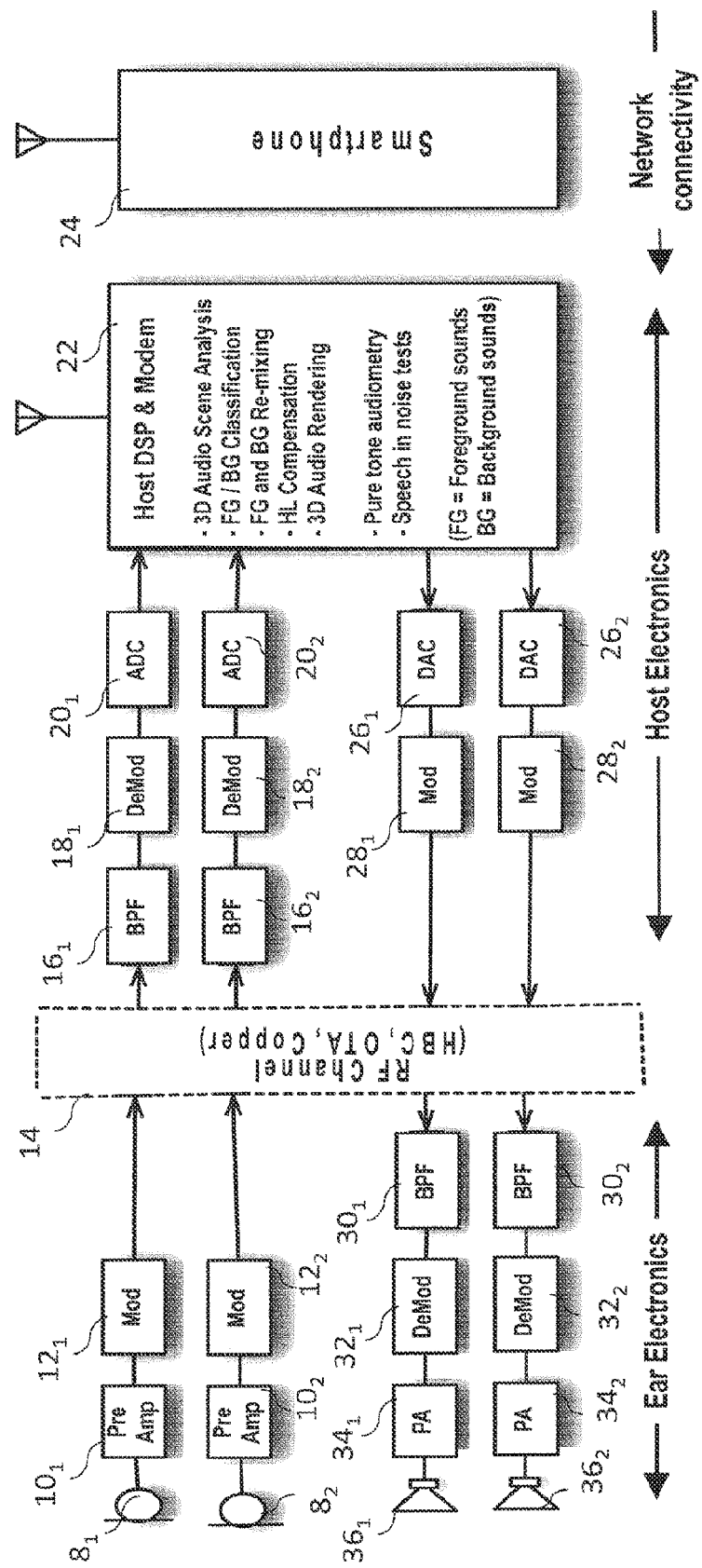
FIG. 2 is a schematic diagram that illustrates a preferred embodiment external device leveraged hearing-assistance system of the invention.

A preferred system of the invention is shown in FIG. 2. The system includes two acoustic sensors $8_1$ and $8_2$, that detect acoustic waves. The sensors $8_1$ and $8_2$, can be conventional sensors. The preferred embodiment uses two sensors, but alternate embodiments of the invention can also use a single acoustic sensor. The two sensors $8_1$ and $8_2$ can be, for example, right and left ear sensors or can also be dual sensors for a single ear. Signals detected by the sensors are amplified by pre amplifiers $10_1$ and $10_2$ and then modulated by modulators $12_1$ and $12_2$ for transmission on a communication medium 14, which can be a wireless medium using a wireless protocol such as Bluetooth, or a wired connection using a wire line protocol such as micro USB or other type of connector. The communication medium 14 connects with host electronics and network connections of a mobile device, such as portable smart phone. The hearing transducer portion of the preferred system does not include any digital signal processor, which substantially lessens power consumption, and can also contribute to freedom to provide a smaller footprint in designing the physical form of a hearing-aid, due to smaller electronics footprint and potentially also a smaller power source.

On the side of the mobile device host electronics, signals from the communication medium are received by band pass filters $16_1$ and $16_2$ and then demodulated by demodulators $18_1$ and $18_2$. Analog to digital converters $20_1$ and $20_2$ and convert the demodulated signal and provide it to the host digital signal processor 22, which is the digital signal processor of a mobile device, such as a smart phone. The DSP 22 is instructed by software to process signals received from the hearing transducer electronics. The DSP 22 can assist hearing and/or conduct noise suppression by producing an enhanced audio signal. The mobile device also includes network connectivity 24, such as standard broadband cellular communications. FIG. 2 shows the digital signal processor being a separate unit from the smart phone 24, which is one alternative that makes the system more universally compatible with mobile devices that lack an adequate digital signal processor. This separate stand-alone external unit also allows the system to function to conduct hearing assistance and/or noise suppression apart from a separate smart device, such as a smartphone, smart watch, or smart pendant. The user will, in that case, conduct adjustments and other operations with the smart device, but the system still operates for hearing assistance and/or noise suppression apart from the smart device. Many modern smartphones include robust digital signal processors that can be leveraged and in that case the smartphone 24 provides the digital signal processor 22 and/or the remaining host electronics. In embodiments with a separate unit that includes the host electronics, the DSP 22 is further provisioned with a wireless module to connect to a smartphone. In other embodiments, there is no stand-alone DSP unit, and the DSP 22 is provided by the smartphone.

Software that is part of the mobile device causes the digital signal processor 22 to perform robust functions. Because the smartphone provides a powerful DSP and significant battery and memory resources, many functions can be provided by the DSP. In a preferred embodiment, the DSP 22 and hearing-aid system software, e.g., an app, perform functions that include 3D audio scene analysis, foreground/background classification, foreground/background re-mixing, hearing loss compensation and 3D audio rendering. The compensation and rendering are preferably based upon pure tone audiometry measurement data and speech in noise data that is obtained through testing/set-up procedures guided by software run on the mobile device.

An output signal is provided by the digital signal processor 22 to digital to analog converters $26_1$ and $26_2$ and then modulated for transmission over the medium 14 by modulators $28_1$ and $28_2$. On the hearing transducer electronics side, band pass filters $30_1$ and $32_2$ provide a signal to demodulators $16_1$ and $16_2$, which provide the demodulated signal of interest (analog equivalent of the output of the DSP 22) to power amplifiers $34_1$ and $34_2$, which drive speakers $36_1$ and $36_2$. The speakers $36_1$ and $36_2$ can be conventional speakers taken from state of the art hearing-aid devices. Artisans will appreciate many advantage of the preferred embodiment that leverages an off-platform digital signal processor 22 of the mobile device. Highly advanced and configurable signal processing can be provided. Processes that require more power than can be provided from on-hearing-aid digital signal processors can be utilized.

Artisans will also appreciate that the preferred embodiment of FIG. 2 trades some spectral efficiency for a number of benefits. These benefits include power efficiency and low latency. The DSP 22 on a mobile device can also supported more sophisticated signal processing, including algorithms that have been used mainly in auditory laboratory and clinic settings on standard computers. The preferred embodiment of FIG. 2 provides the ability to offload complex processing to an energy-rich external host in the form of a mobile device. A smart phone is an example, and additional examples include smart-watches, smartphone, or a pendant. This removes energy consumption and digital signal processing from the highly restrictive constraints imposed by the form factor and power limitations of a hearing-aid device that is configured to be comfortably and discretely worn by a user.

The modulators, demodulators, DACs and ADCs can leverage modern and powerful techniques. For example, analog modulation techniques such as Frequency Modulation (FM) can be realized using voltage controlled oscillators (VCOs) and phase locked loops (PLLs)—building blocks that have been optimized for power and area for many generations of digital radios across multiple process technologies that are supported by mobile platform. The system of FIG. 2 preferably employs Frequency Duplex Division (FDD) for the microphone and speaker paths. Preferred FDD (FM is the preferred modulation scheme) uses different carrier frequency for different microphones and the two speaker paths. This creates duplex operation in the frequency domain, as mic path and speaker paths can operate at the same time.

Advantageously, preferred embodiments prepare the signal sensed from the acoustic sensors, $8_1$ and $8_2$, e.g. microphones, for transmission in analog form. FDD is a preferred technique for accomplishing the analog transmission. This approach of the preferred embodiments permits shifting the energy-expensive ADC outside of the hearing-aid ear electronics, i.e., a preferred embodiment includes a hearing transducer that has no analog to digital to converter. The hearing transducer electronics preferably consist of low power requirement analog components. The ADC needed to support digital signal processing is instead within the energy-rich host electronics of the mobile device platform. In FIG. 2, the host side of the system is a mixed analog and digital circuit, that is divided at the ADCs and DACs being the boundary between the analog and digital domains.

FIG. 2 shows two microphone and speaker paths as a preferred example for a right and left hearing-aid system. Artisans will appreciate that the architecture of FIG. 2 enables additional microphone paths for spatial audio capture. In a preferred embodiment, the system of FIG. 2 also leverages a microphone provided by the host device to provide a spatially separated acoustic signal. In other embodiments, an additional microphone, sole microphone, or a plurality of microphones serving as the acoustic sensors $8_1$ and $8_2$ are provided apart from the hearing transducer device to be worn on other parts of the person away from a person's ear. For example, a microphone can be an accessory that is worn discretely as a pin on a garment, as part of jewelry or in another discrete package. In that case, a microphone can be better placed for directional or omnidirectional sound sensing. Source separation and directionality are procedures whose efficiency is greatly improved by such increasing the separation of multiple microphones. Directionality is only of benefit when the direct sound coming from a signal of interest or from an interference source is significantly stronger than the reflections of these sounds from room boundaries. However, the ability to identify a source on the basis of its spectral or other qualities can greatly enhance the possibility of accepting and enhancing information determined to probably belong to that source and rejecting information determined to probably represent interference. Thus, integrating information from multiple, well separated, microphones provides for operation that cannot be realized as well with microphones solely on the head, e.g., four microphones on the head (two microphones on two ears). An example technique for attenuation of signals at different angles using multiple microphones is disclosed in Boothroyd, U.S. Published Patent Application Number 20070064959, published on Mar. 22, 2007.

A particular preferred embodiment in accordance with FIG. 2 uses frequency modulation FM β=10 resulting in FM bandwidth of ~450 kHz per channel, compared with β=5, 200 kHz in commercial FM. This provides CD quality audio with full bandwidth for all microphone and speaker paths. Example signal processing algorithms to improve audio quality include the examples discussed above and listed in the digital signal processor block 22 of FIG. 2.

In preferred embodiments, a user will have the ability to adjust digital signal processing through a graphical user interface provided on the display of a host device smart phone. Example adjustments and settings can include remixing of foreground and background acoustic content depending on the listening environment. For example, a user could select a number of type of environments, e.g., home, office, public street, stadium, or public transportation. The selection of a particular environment can access standard mixing and isolation processing, or can access environment settings that have been customized according to a particular user in a setup process or over time with reference to adjustments made in particular environments over a period of use.

Another example setting accomplishes selective noise suppression. This is accomplished, with reference to FIG. 2, by buffering an incoming signal x(n) (such as before or after processing by the DSP) for a short time period of K, such as a few seconds. A user is presented a noise suppression option via the touch screen of the smart phone 24. When the user listens to objectionable noises, for example loud explosions (e.g. in a military or industrial setting the hearing-aid system can be used also as a selective noise suppression system for users that have or don't have any hearing impairment), a user has the option to selectively suppress such sounds at the time the sounds are encountered. Upon user input, a set of features F(x) corresponding to signal x(n) in the buffer is computed and stored in a database in the memory. During normal operation, the feature set F(x) of signal x(n) is compared with plurality of saved feature sets {F(x)}. If there is a match with an entry in the database, say $F_i(x)$, then the features $F_i(x)$ are suppressed from the signal to generate a modified signal x'(n) for playback. Otherwise, the original signal x(n) is used for playback. This provides effective and adaptive noise suppression.

Particular preferred embodiments use wireless communication as the communication medium 14 of FIG. 2. In a particular wireless embodiment, the Human Body Communication (HBC) low power communication channel in the 20-80 MHz band has been simulated to give 20-40 dB less path loss, compared with 2.4 GHz for over the air (OTA), enabling wireless streaming of full-HD audio in a power budget far less than an equivalent Bluetooth solution. The HBC can be provided by commercially low power devices that create a low power but secure communication channel via capacitive coupling to the human body. Some of the present inventors have found that an FM transmission system with two PLLs (phase locked loops) that are referenced to each other provide effective HBC communications. For example, a first PLL and a second PLL are each configured to receive the same input and generate separate FM outputs. The output of the first PLL is connected to the phase detector of the second PLL, and the output of the second PLL is connected to the phase detector of the first PLL. The second PLL further includes an inverter following the phase detector. Another system includes a plurality of FM modulators, the output of each modulator is resistively summed or summed in the current domain and connected to a common wire, resulting in a composite FM signal.

A preferred signal target for the electronics is 1 mA/ear and 50 mA for the host electronics. Although FM modulation is indicated in this particular embodiment, any type of digital or analog modulation is possible from communication of sound and other peripheral information from the ear electronics to the host electronics through the medium 14.

In preferred embodiments in accordance with FIG. 2, the DSP module 22 resides in a body worn device such as a smartphone, instead of a hearing-aid component worn on or in proximity to the ear of a user. In preferred systems, the DSP 22 receives acoustic data from both left and right ears in systems that include two microphones (acoustic sensors) in the left and right ear. The touch screen, computational and connectivity capabilities of a typical smartphone that forms part of a preferred system enable many HA features that are not possible in the conventional architecture.

In a preferred embodiment consistent with FIG. 2, there are multiple microphones at left and right ears and/or other locations to enable beamforming capabilities at the DSP 22. In addition, the DSP 22 can perform binaural processing to perform 3D audio scene analysis. The DSP 22 can further incorporate signal processing algorithms to identify sounds as foreground and background automatically, in real time. In preferred embodiments, the user has the ability to select certain sounds as foreground or as background, depending on the particular listening environment. For example, the graphical user interface of the smartphone or other portable device can provide a selection menu to designate TV sound or music as background or foreground depending on the user's preference at the time, and this setting can be accessed and adjusted at other times.

In a preferred embodiment consistent with FIG. 2, the DSP further compensates for known hearing loss patterns of a particular user. These are established by normal professional evaluation, or by testing provided with the system of FIG. 2 via guided menus on the display of the smartphone or other device. The DSP 22 can be directed to apply compensation for a particular established hearing loss pattern of a user, while also applying user preferences in the specific listening environment.

In a preferred embodiment consistent with FIG. 2, the DSP 22 accentuates 3D separation between sound sources to improve intelligibility, such as in the multi-talker environment, and thus mitigate the "cocktail party effect" that affects people with hearing loss to a much greater degree than people with normal hearing.

In a preferred embodiment consistent with FIG. 2, software provided on the smartphone device or that is used to drive the DSP 22 provides in situ pure-tone testing. The generation of pure tones within the device to provide in situ measurement of thresholds and uncomfortable listening levels a function of frequency. User responses to indicate when a tone is just audible and uncomfortably loud will be made possible with a touch screen incorporated into the device. User input is obtained through displays and selections on the associated smartphone device.

Artisans will appreciate that system of FIG. 2 enables automatic fitting of hearing-aids guided by the smartphone device through menus and graphical user interfaces. Preferred software makes use of threshold information for automatic setting of the frequency-dependent gain, amplitude compression, pair-wise comparison, and uncomfortable loudness level for maximum output so as to provide the listener with a speech signal that is audible, comfortable, and as complete as possible, for quiet, moderate, and loud speech inputs. For users with extreme loss of high-frequency hearing, the processing can also introduce a small amount of frequency compression. Clinically, gain parameters are based primarily on thresholds. Frequency-dependent comfortable loudness levels are not measured. Overall comfort to a speech signal is considered (informally) at the time of fitting once the frequency shaping and processing has been implemented. Uncomfortable loudness levels are sometimes used to set the maximum output. Thus, the in situ pure-tone testing capability improves over standard fitting protocols and facilitates self-tuning of certain features.

In a preferred method of the invention using a system of FIG. 2, an audiologist determines the hearing loss profile and programs the hearing assistance parameters in the hearing-aid, in accordance with the current standard of practice. The user is then provided with self-fit software in the host/mobile device to experiment and optimize the parameters best suited for different real world environments that are not adequately represented in the audiologist's clinic. A user can start with the audiologist's prescription parameters and modify the parameters for specific environment. In an example preferred embodiment, the software provides the user with a list of pre-adjusted settings matched with the corresponding noise backgrounds and GPS (global positioning satellite) tagged locations. These settings saved by the user are sorted in the order of matching background noise types and levels and then displayed on the screen. The GPS data can be used to automatically switch to environment settings based upon the position of the user determined from GPS data.

In preferred embodiments consistent with FIG. 2, the system also provides for user adjustment. The touch screen of the mobile device and software provides for user-adjustment of parameter such as the frequency-dependent gain, amplitude compression, maximum output, and frequency compression for fine adjustment to individual preferences and as a function of the listening environment. The touch screen and the ability to generate speech stimulus further enable pair-wise comparison capabilities. The significant memory resources provided by the host and smartphone or combined smartphone-host enables the retention of many settings for different environments.

In preferred embodiments consistent with FIG. 2, the system also provides for remote adjustment by a clinician for those users who lack the insight, confidence and/or motivation to make their own adjustments. The mobile device transmits data to the clinician and can generate an interactive session connecting the clinician to a user via another app, such as apps that create audio or audio and video connections between users.

In preferred embodiments consistent with FIG. 2, the system also enables device-assisted adjustment. Self-adjustment can be facilitated via the touch screen. Changes can be made on the bases of the user's responses to questions about sound quality and listening experience posed by the device.

In preferred embodiments consistent with FIG. 2, the system also enables listening training. While everyday listening experiences can help users adjust to an auditory signal that is degraded and/or modified, some users may benefit from pre-programmed listening exercises, taking advantage of the touch screen in forced-choice tasks. The logged results can also be used to provide a clinician with information for changes of hearing-aid prescription and or courses of listening training. User interaction over time can also adjust for deteriorating listening abilities of the user over a time period without need of replacement of a hearing-aid or visits to a clinical setting. This can be of great benefit to users that have other health problems and have difficulty visiting clinical settings. This adaptability also provides for cost savings for users, and any government agency or insurance company that financial supports users in acquiring and replacing hearing-aid systems over time.

In preferred embodiments consistent with FIG. 2 that have a separate host not integrated into a smartphone or other device, the system also enables external inputs from devices other than smartphones. For example, an infrared (IR) receiver used in theaters by people with hearing loss is provisioned with a wireless link to communicate with the DSP. In this configuration, the IR receiver can function as the host, and provide remote audio content for mixing with local sounds.

In preferred embodiments consistent with FIG. 2, the system also enables use of a remote microphone as an acoustic sensor. The remote microphone can be used as a close-talking wireless microphone for one-on-one communication in noisy environments. The addition of an input from this microphone to that available for the ear-level microphones provides data that can assist in noise-reduction and directional hearing.

Figure 3:
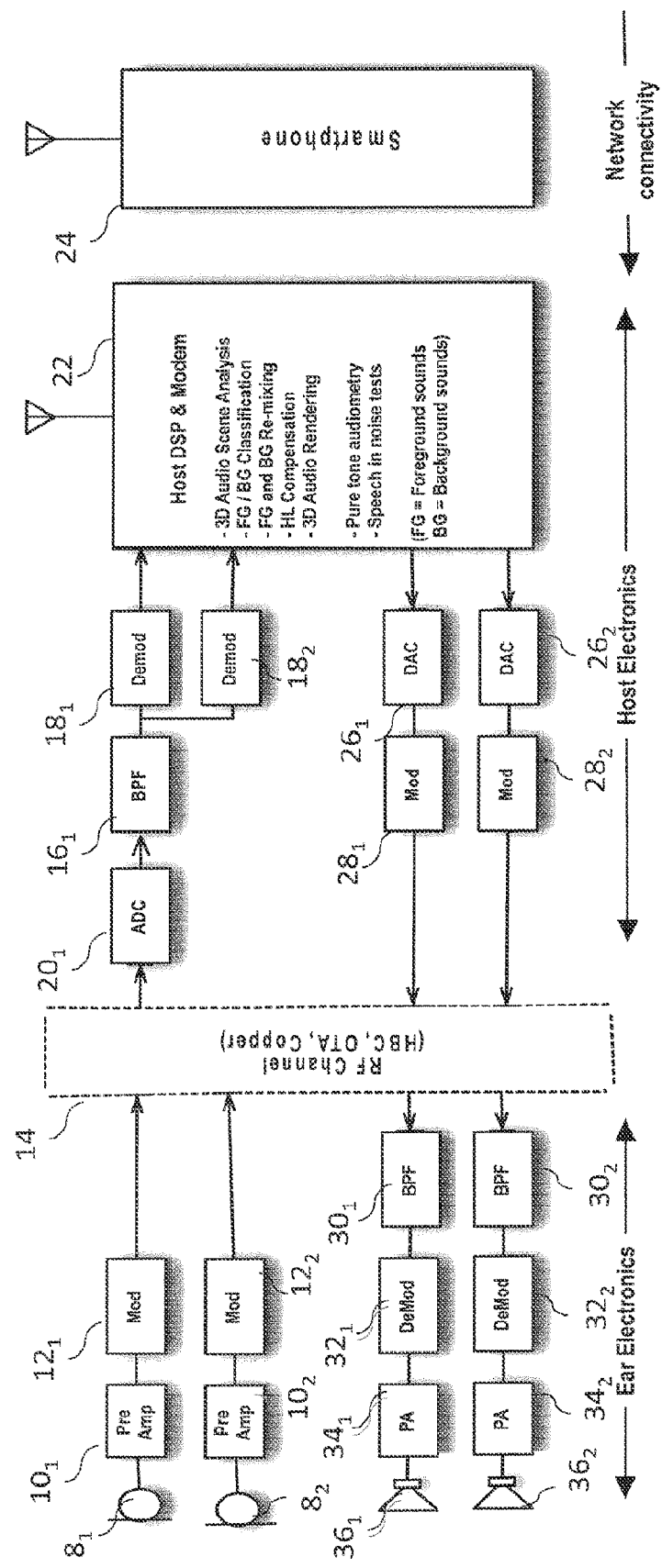
FIG. 3 is a schematic diagram that illustrates another preferred embodiment external device leveraged hearing-assistance system of the invention.

FIG. 3 shows another preferred embodiment system of the invention. This embodiment is similar to the FIG. 2 embodiment and common reference numerals are used to identify comparable components. Compared to the FIG. 2 embodiment, the FIG. 3 embodiment the host side includes a different division between the analog to digital domain, as the ADC converter $20_1$ converts the signal received from the medium 14. A single ADC is then used, and the bandpass filter and demodulators are realized in the digital domain. As with the FIG. 2 embodiment, the FIG. 3 embodiment enables binaural processing, with significantly more CPU power provided by the host than is possible with the conventional approach to hearing-aid devices.

Figure 4:
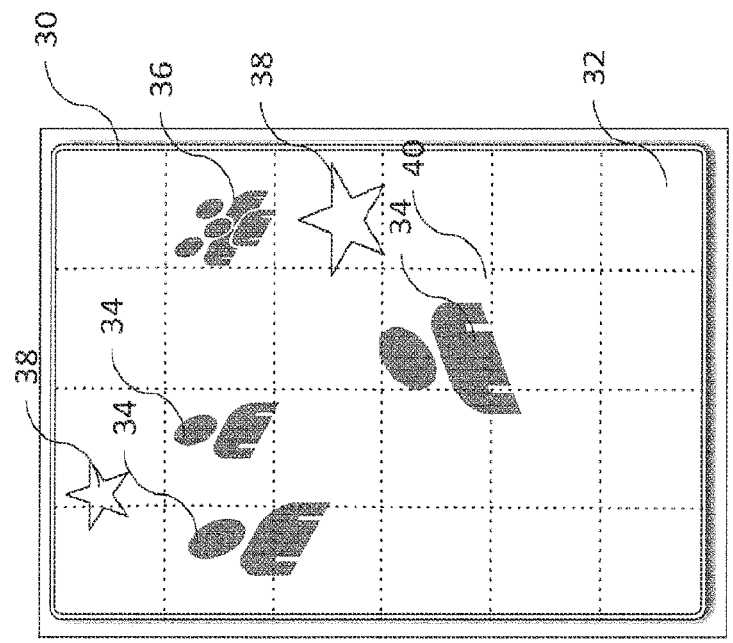
FIG. 4 illustrates a preferred interface generated by software in a system of the invention on touchscreen of a smartphone for selecting a foreground source of interest.

FIG. 4 shows an example interface that is provided on the display of a smartphone 30 by software installed to implement a system of the invention such as the preferred example systems of FIGS. 2 and 3. The display presents a grid that is divided into a plurality of regions 32. Based upon acquired acoustic data and possibly also image data acquired by the host/mobile device, the software generates graphical representations of auditory sources and their relative position. In the example, individual persons 34 and a group of persons 36 are represented. Additionally, an unidentified generic auditory sources are represented with stars 38. With the auditory sources detected and represented, the user can select a foreground source of interest, by touching the region of the auditory source which then is transformed into a highlighted region 40 on the display of the smartphone 30. The multi microphone array is then steered electronically according to the selection to form an acoustic beam to this region, such as by a delay and sum approach. Now, the interaural phase differences (IPD) and the interaural level differences (ILD) are correlated for the source in the selected region and uncorrelated for remaining sources. This property is used to enhance signals from selected regions. Further, IPD and ILD are used to track the source of interest, if the user selects to track moving sources. The tracking of sources can therefore be conducted without further selections or inputs from the user.

Experimental Simulation Data

Experimental simulations were conducted to test the invention. Experimental devices were simulated. The experiments provide additional embodiments and preferred features that are consistent with the above embodiments. The experimental simulations will now be discussed.

In the simulations, a simulated hearing-aid system was created with a tablet computer for stimulus generation and control, an audiometer to serve as a power amplifier, and an audiometric insert transducer for delivery of sound to the subject's ear canal. Custom software was used to generate speech while the subject adjusted overall gain, in 4 dB steps, low-frequency cut in 6 dB steps, and high-frequency boost in 6 dB steps. After adjustment, word recognition in short sentences was measured using both the self-adjusted gain and spectrum as well as a gain and spectrum intended to simulate unamplified speech at 65 dB SPL. Five hearing-impaired adults were tested in this pilot study. The time taken for adjustment ranged from 22 seconds to almost three minutes with an average around 1.5 minutes. With one exception, the subjects appeared ready to explore the gain and spectrum options before settling on one. After a speech-perception test with the first self-adjustment, however, subjects tended to seek more overall gain and more high-frequency boost. Group mean word recognition was 46% without amplification, 88% after the first self-adjustment, and 91% after the second self-adjustment with marked individual differences. In response to a questionnaire, subjects indicated they would be very likely to wear a hearing-assistance device with self-adjusting capability. Their preference, however, was for a wrist-worn interface and processor, wirelessly linked to ear-worn transducers whose form factor is similar to that of behind-the-ear hearing-aids. Note, however, that these were experienced hearing-aid users. Although there are many questions unanswered, this pilot demonstrated the feasibility of self-adjustment of hearing-aid system gain and output spectrum to attain a marked increase in speech-perception performance.

Figure 5:
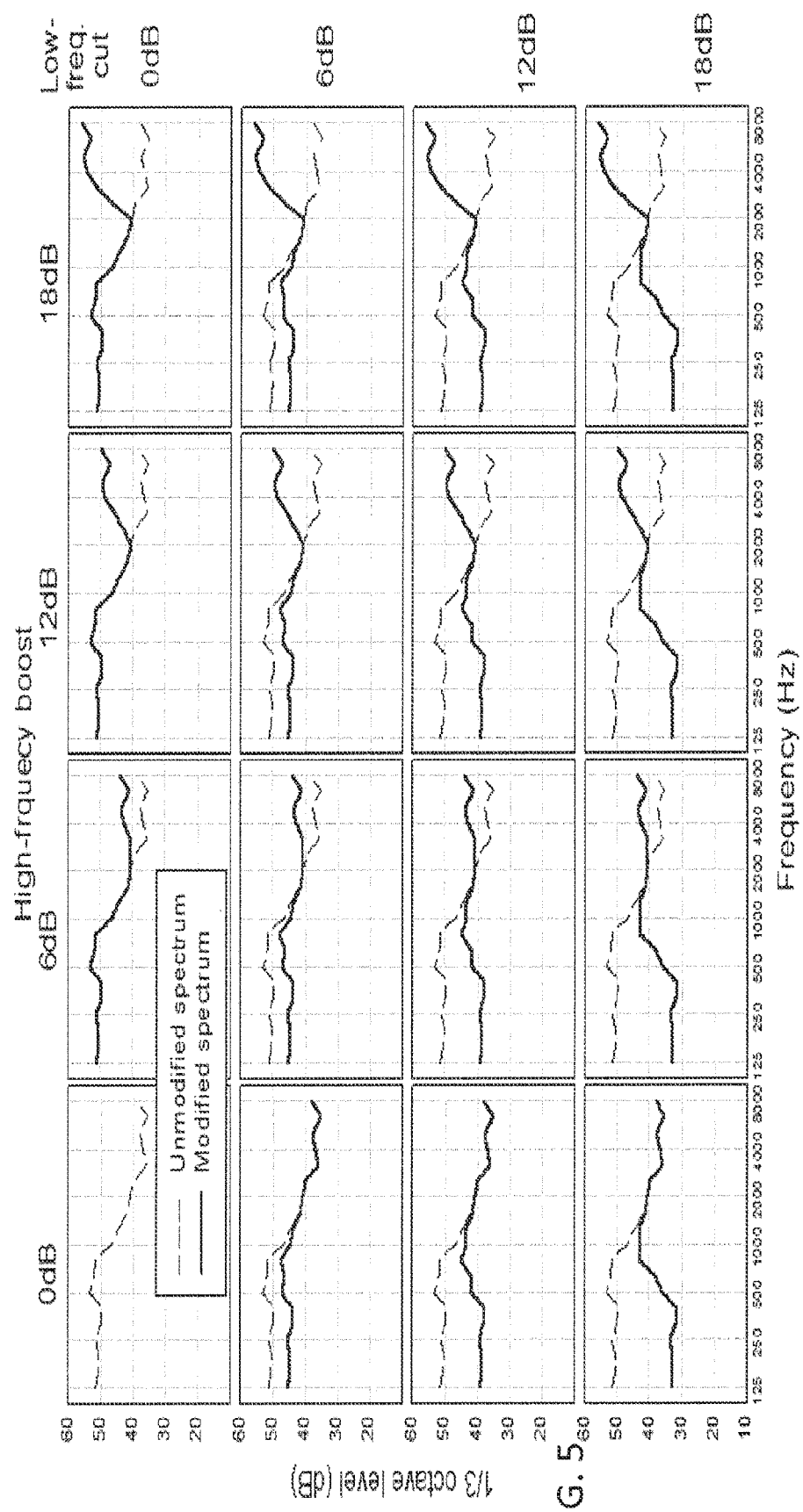
FIG. 5 is data in a matrix of sixteen spectra used in experimental fitting procedures to simulate a preferred system of the invention.

The speech material chosen for the simulation consisted of 100 meaningful 4-word sentences (e.g., "Kings wear gold crowns"). These materials were written and recorded by a person. The 100 words were divided into 10 sets of ten sentences each. The original recordings were digitized with a sampling rate of 44100 Hz but were down-sampled to 22050 Hz for the simulation. The spectrum of the recorded speech was adjusted to match that determined in previous research to represent the typical hearing-aid input and used in the ANSI standard for estimation of Speech Intelligibility Index To create a range of frequency-responses, the recorded sentences were filtered into 3 bands: low-pass from 1000 Hz, band-pass from 1000 to 2000 Hz, and high-pass from 3000 Hz, using Kaiser FIR filters. These bands were then recombined to provide attenuations of 0, 6, 12, and 18 dB in the low-frequency band along with amplification of 0, 6, 12, and 18 dB in the high frequency band. The result was 16 sets of pre-recorded stimuli to be incorporated into the self-fitting software. The matrix of sixteen spectra is shown in FIG. 5. In FIG. 5, the matrix of spectra includes the unmodified spectrum represented by dashed lines and the modified spectrum in solid lines. Subjects were given the option of adjusting the low-frequency cut and high-frequency boost independently, providing control of the tilt the spectrum of the amplified speech. Artisans will appreciate that the prior generation of large numbers of digitized sentences would be unnecessary in a commercial system in accordance with the preferred embodiments, because systems in accordance with the preferred embodiments can conduct real-time processing of incoming speech and other auditory stimulation during a fitting or adjustment routine guided by software run on the portable device, such as a smartphone.

Self-fitting and testing software was implemented in the experiments. The software provides interfaces that are adaptable to smartphones and that can be used with the FIGS. 2-4 embodiments, for example. The software in the experiments provided the fitting stimuli (100 sentences×16 spectral options) to subjects through use of a computer. Digital-to-analog conversion was implemented in the computer's sound card and the sound card's output was routed to a clinical audiometer or power amplifier for presentation to the subject.

A calibration interface generates concatenated sentences, without either high-frequency boost nor low-frequency cut so that the gain of the external amplifier can be adjusted to arrive at the subject's preferred dB level (equivalent to initial adjustment of hearing-aid gain). This interface also allows for calibration of the equipment, including the frequency response of the output amplifier-transducer combination and the step-size of the software-based output adjustment.

Figure 6:
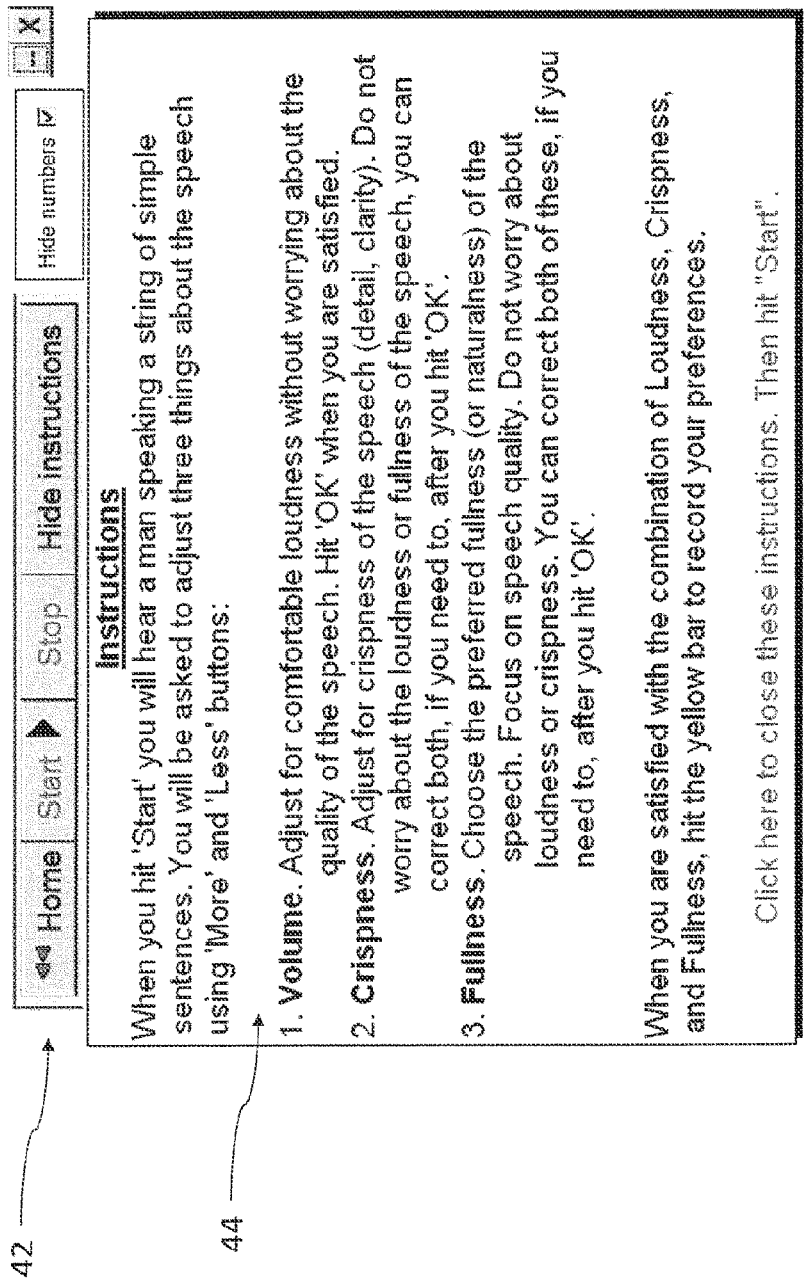
FIG. 6 illustrates a preferred introductory testing interface that can be presented on an external device and was used in experiments to simulate a preferred system of the invention.

As self-adjustment interface allows the subject to change the amount of high-frequency boost in 6 dB steps, the amount of low-frequency cut in 6 dB steps, and the overall rms level in 4 dB steps. Written instructions to the subject and an introductory testing graphical interface are shown in FIG. 6. This introductory testing interface screen of FIG. 6 was presented during testing on a personal computer, but can readily be adapted to the display of a smartphone as represented in FIG. 4, as can an of the interface screens discussed in the experiment section of this application.

The introductory self-adjustment testing interface includes a button bar 42 for navigation and an information presentation section 44 for textual and/or graphical instructions for conducting fitting adjustments. Other options include a "home" screen navigation button in the button bar 42 and a "hide instructions" check box. Instructions for fitting volume, crispness and fullness are provided in the information presentation section 44 followed by a hyperlink that replicates the function of a "start" button in the button bar.

Figure 7:
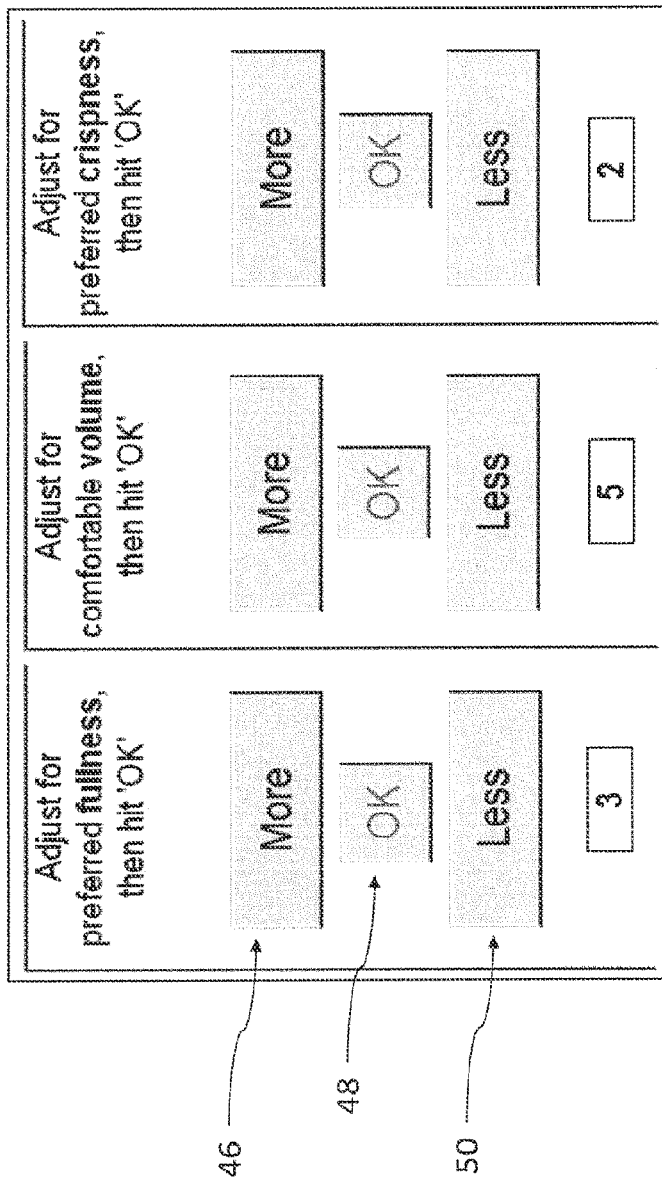
FIG. 7 illustrates a preferred self-adjustment interface that can be presented on an external device and was used in experiments to simulate a preferred system of the invention.

When start is selected in the introductory self-adjustment testing interface of FIG. 6, the user is presented with an adjustment interface of FIG. 7. The adjustment interface presents more 46, OK 48 and less 50 buttons for each of a plurality of adjustment categories, which are fullness, volume and crispness in the preferred example self-adjustment testing interface. In the experiments that represent preferred example self-adjustment actions of the software, the user is allowed to change the amount of high-frequency boost in 6 dB steps, the amount of low-frequency cut in 6 dB steps, and the overall rms level in 4 dB steps.

Figure 8:
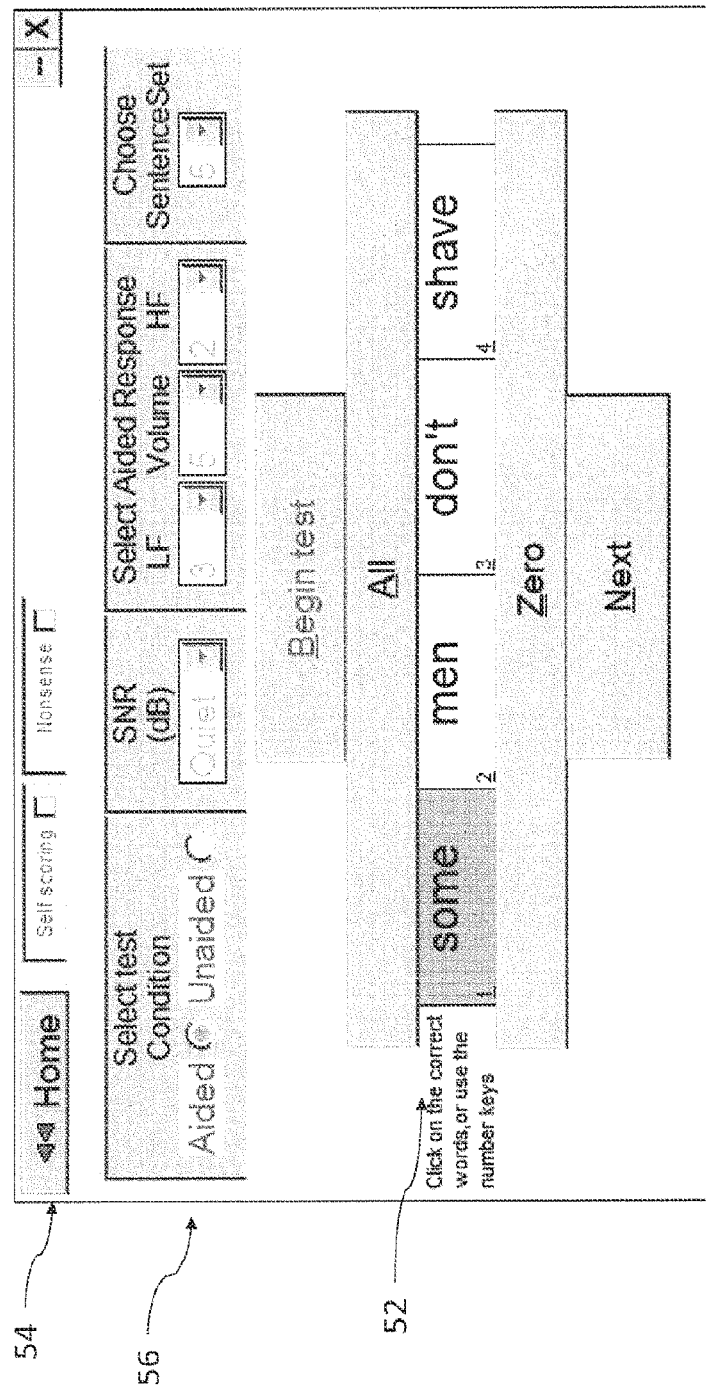
FIG. 8 illustrates a preferred speech perception interface that can be presented on an external device and was used in experiments to simulate a preferred system of the invention.

Completion of the self-adjustment testing interface of FIG. 7 leads to the speech perception interface of FIG. 8. The speech perception interface facilitates measurement of word recognition in sentences with the selected dB level and spectral modifications (referred to, here, as "aided") selected in the self-adjustment testing interface of FIG. 7 and also at 65 dB SPL without the spectral modifications (referred to, here, as "unaided"). Sentences are presented one at a time and the subject is asked to repeat the sentence. The sentence is shown as text in a text section 52 and the tester clicks or taps on the correct words. The text section 52 also includes buttons for "all," indicating complete success and "none," indicating total failure. An option for self-scoring is part of a menu bar 54. If selected, display of the text is delayed until the subject has repeated the sentence. A status bar 56 indicates whether an aided or unaided test is being conducted, the SNR level, and the level adjustments for an aided test, as well as the sentence set being tested. The software can set the status bar 56 to be active or inactive, the active state would allow direct adjustment and selection in the speech perception interface of FIG. 8, while the inactive state would require a user to return view menu bar navigation to the self-adjustment testing interface. When inactive, the software can present a predetermined or variable number of test sentences automatically according to the testing results, with a lesser number of sentences being presented after a number of successful tests, for example.

Figure 9A:
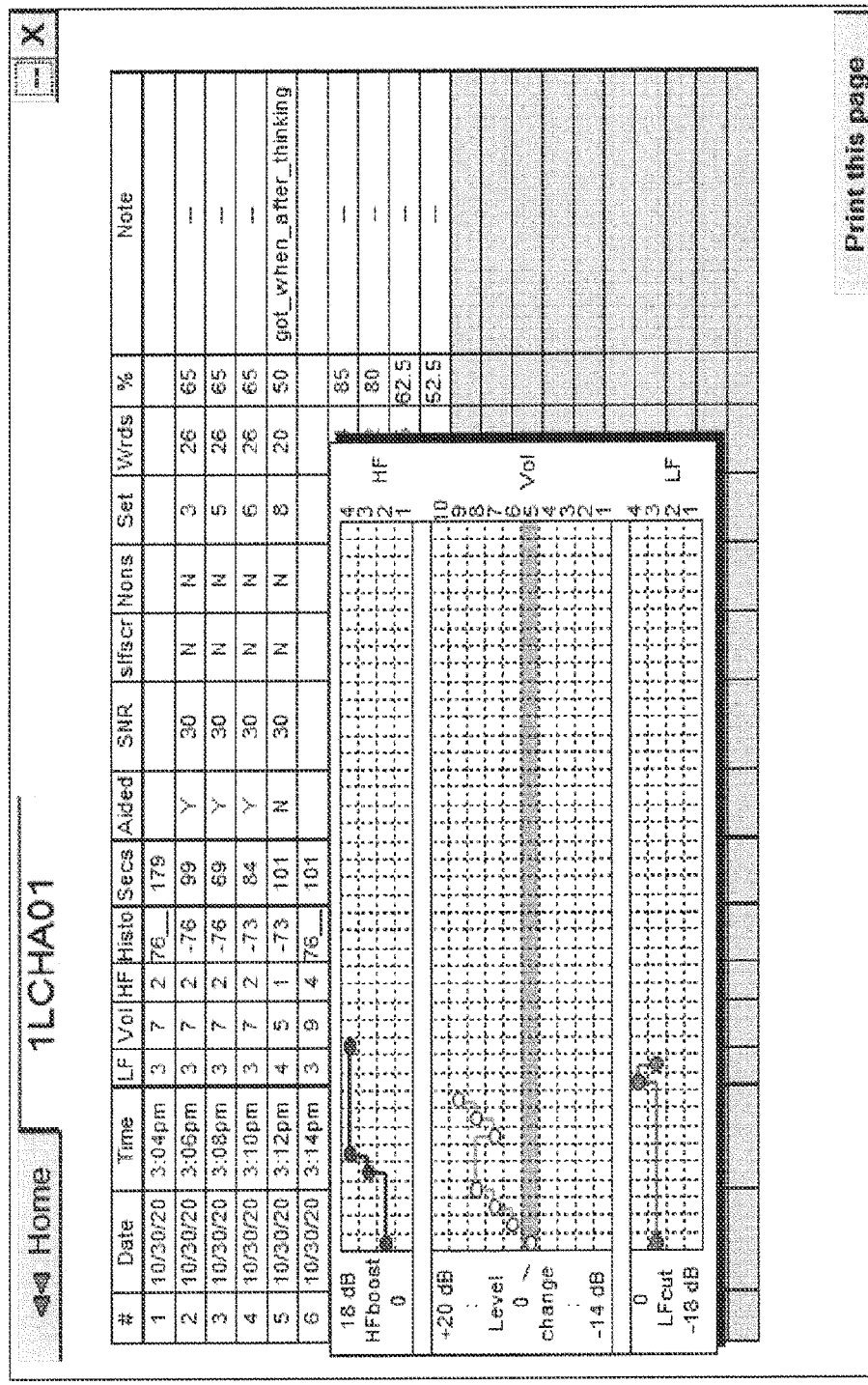

A data results display is shown in FIGS. 9A and 9B. This display is for a professional audiologist or clinician, and can be presented in commercial embodiments at a location remote from a smartphone used to conduct self-fitting to allow a professional to evaluate the self fitting and testing procedures and provide adjustments. In preferred embodiments, via Internet connection of a smartphone of a user and a remote professional, the remote professional can direct the software on the smartphone to make additional adjustments to the DSP 22 to further refine the listening experience provided by the hearing transducer device. FIG. 9A shows logged data for both the self-adjustment process and the speech perception testing on separate lines. When a line is selected, a full display of the history for that process pops up—as illustrated in FIG. 9B. The performance expansion in the lower panel of FIG. 9A shows percent correct for both words and whole sentences together with the ratio of the logarithms of the two recognition probabilities. This last measure (j-factor) provides an estimate of the effective number of independent test items in a 4-word sentence. A value of 4 indicates that each word is being recognized independently without help from sentence context. A value of 1 indicates that sentences are never partially recognized.

Figure 10:
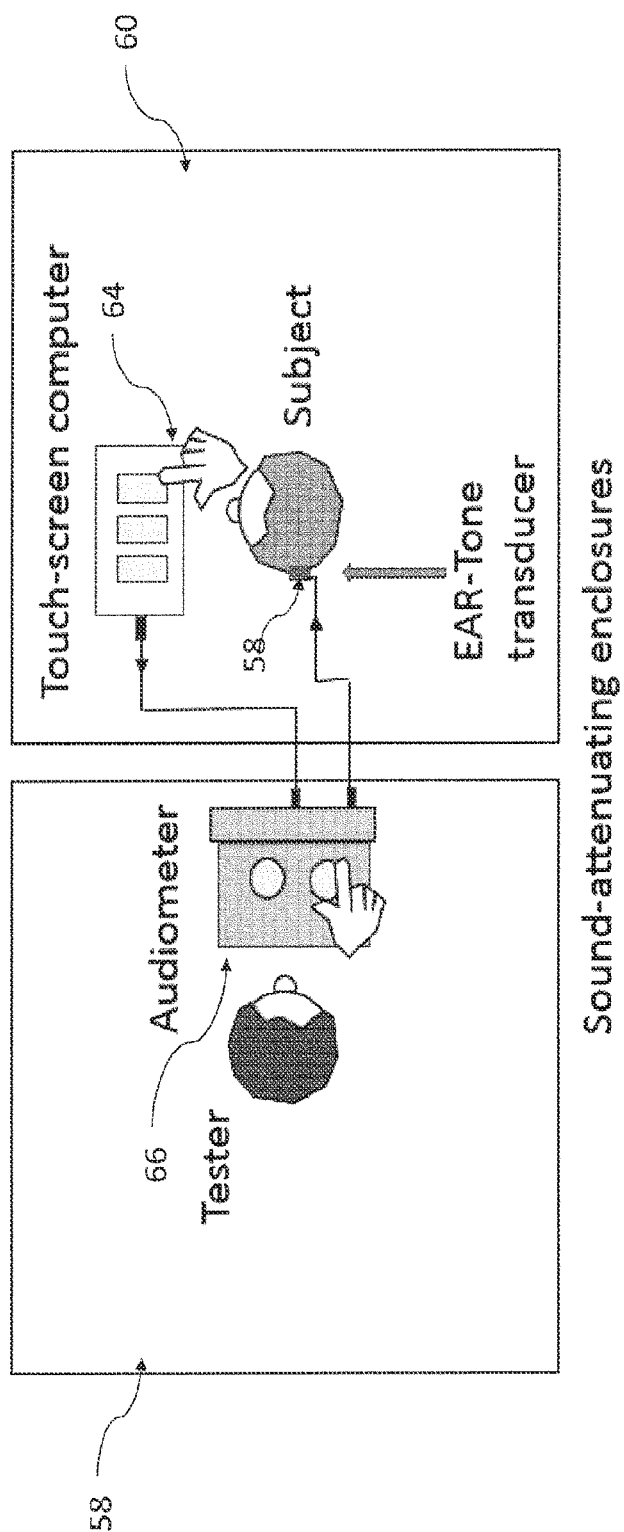
FIG. 10 illustrates a remote clinician assisted fitting arrangement used in experiments to simulate operation a preferred system of the invention.

During the experiments a remote connection between a professional tester and subject being fitted via smartphone app was simulated with the professional and subject in separate sound-attenuating enclosures 58 and 60 as shown in FIG. 10. In the experiments an ear tone transducer 62 performed the function of a hearing transducer device, and a touchscreen computer 64 served the role of a smartphone. An audiometer 66 served the role of the DSP.

A Sony Vaio laptop/tablet computer operating under Windows 8 provided the touchscreen computer 64. The computer's audio output was routed to the auxiliary input of a clinical audiometer 66, which served as a power amplifier with adjustable gain. The amplified output was routed to an audiometric insert earphone 66 (ER-5A from Etymotic) and connected to the subject's ear canal with an expanding foam insert for full occlusion.

In the experiment, five hearing-impaired adults were recruited from a pool of individuals who had indicated a willingness to participate in experiments related to hearing and hearing loss. All were experienced hearing-aid users and had been subjects in other experiments conducted at San Diego State University. Two of the five were men. The age range was from 66 to 82 years. Three-frequency average hearing loss, in the ear used for testing, ranged from 42 to 57 dB. Pure-tone audiograms were available from a previous experiment. FIG. 11 provides information on the five subjects.

The particular experimental test procedures are provided.

i) After explanation of the study, a test ear was selected, based either on the subjects preferred ear or (in the case of S01) the greater need for amplification.

ii) Otoscopic examination confirmed the absence of ear wax and the output transducer was coupled to the ear canal.

iii) Concatenated sentences were presented and the hearing-level dial of the audiometer was adjusted adaptively until the subject indicated that the volume was at the preferred level.

iv) The subject then read the instructions for self-adjustment and began the process while listening to the concatenated sentences. Adjustment began with an initial setting of 6 dB low-frequency cut and 6 dB high-frequency boost. The only option at this point was self-adjustment of overall level, if desired. When confirmed by the subject, the option for changing high-frequency boost was provided. The subject then had the opportunity to readjust overall volume before being shown the option for adjusting low-frequency cut. A final option to readjust the three parameters was then offered before the selected settings were logged.

v) The self-adjustment was followed by speech-perception testing in which the subject heard and responded to twenty or thirty sentences with that adjustment (i.e., aided) and twenty or thirty sentences without low-frequency cut or high-frequency boost and the audiometer reset so as to generate a speech level of approximately 65 dB in the ear canal (i.e., unaided).

vi) Steps iv) and v) were then repeated.

Data from the testing showed individualized results that would benefit a fitting and satisfaction process by applying self- and assisted-fitting and adjustment in according with the invention. Individual differences in approach to the self-adjustment process were immediately apparent. S01, for example, explored the full range of options for high-frequency boost before returning to the initial setting. After a little experimentation with low-frequency cut, this subject, again, returned to the initial setting. After exploration of overall gain, S01 selected an increase of 8 dB over an initial adjustment. Time taken was almost three minutes. In contrast, S04 simply accepted the initial settings, taking only 22 seconds. Although the goal was to let subjects complete the process without any coaching, this subject was encouraged to explore the options at the second session. Even then, that subject made only one small change to overall level.

FIG. 12 includes final self-selected amplification parameters for the five subjects. At the first session, the mean low-frequency cut selected by this sample was 4.5 dB. At the second session, this increased to 6 dB. The mean high-frequency boost was 12 dB at the first session, increasing to 16 dB at the second. The mean gain was 23 dB at the first session, increasing to 28 dB at the second. As a group, these subjects increased overall gain, low-frequency cut, and high frequency boost after they had experienced the speech-perception test. The mean time taken for adjustment was 1 minute and 33 seconds at the first session, falling slightly to 1 minute and 26 seconds at the second session. There was, however, individual variation from a low of 22 seconds (S04 session 1) to a high of almost 3 minutes (S01 session 1).

FIG. 12 also shows speech-perception performance, expressed as percent words recognized in the test sentences. In the unaided condition, the mean score was 46% (range 7.5% to 84%). In the first self-adjusted aided condition (session 1) the mean score rose to 88% (range 65 to 95%). In the second self-adjusted aided condition (session 2) the mean score rose a little further to 91% (range 83 to 98%). The mean hearing assistance benefit, expressed as the difference between the aided and unaided scores, was 42 percentage points at session 1 and 47% pts at session 2.

At the second session, and after they had taken the speech-perception test, the tendency was for subjects to increase overall gain and high-frequency boost. This was particularly apparent for S01 who increased overall gain by another 12 dB. It should be noted that this subject, during the initial adjustment of audiometer gain, selected only a 3 dB increase over the simulated unaided condition. Other subjects chose either 20 or 25 dB. In a sense, S01 was compensating for a poor decision on listening level before the first self-adjustment session.

Using the estimated standard errors for individuals, subjects S02, S03, and S04 showed a statistically significant aided benefit at both sessions ($p<0.01$). Subject S01 only showed benefit at the second session ($p=0.004$). This subject was also the only one that showed evidence of significant improvement from session 1 to session 2 ($p=0.05$).

In the group data, using inter-subject differences to estimate error variance, there was a significant benefit at session 1 ($p=0.02$) and session 2 ($p=0.01$) but no evidence of a significant difference between the two sessions ($p=0.62$).

These findings support the conclusion that subjects of this type are capable of self-adjustment in ways that will increase speech-perception performance.

There are several examples of subjects going back and forth between two conditions before settling for one of them (S01, S03, and S05 at session 1; S01, S02, and S03 at session 2). Most of these examples were for low-frequency cut but S03 also followed this pattern for overall gain.

The experiments showed that self-adjustment of hearing-aid gain and frequency response to arrive at preferred listening conditions using an interface that simulates preferred embodiments can improve frequency-dependent audibility and speech recognition performance. The experiments also showed that self-adjustment is likely to change in the direction of increased output after subjects have experienced speech-perception tasks with their initial adjustment, which shows that the ability to update fitting remote from a clinical setting will greatly benefit users of systems of the invention. The results also show that users can remotely access clinical help through a system of the invention via connection between a smartphone and a professional via an Internet connection. The experiments also shows that use of the invention can improve extended and satisfactory use of a hearing-aid system, as the system provides an effective self-adjustable hearing-assistance device that can improve initial performance and greatly extend lifetime by allowing adjustments that account for declining user ability.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A hearing transducer device, the device comprising:
a housing configured to fit on or around a user's ear, and accommodated within or attached to the housing circuitry consisting of:
 a power source;
 an amplifier for amplifying a processed signal; and
 a speaker for outputting an amplified processed signal from the amplifier;
 an interface to communicate with an external device having a digital signal processor;
wherein the interface receives a processed signal obtained by an acoustic sensor and processed by the digital signal processor of the external device and provides an enhanced audio signal to the amplifier for output by the speaker, wherein:
the acoustic sensor comprises a first device with at least one microphone and wherein the interface comprises at least one receiver;
at least one pre-amplifier is connected to the at least one microphone;
at least one modulator is connected to the at least one pre-amplifier;
at least one transducer is connected to the output of the at least one modulator;
at least one power amplifier is provisioned to drive the at least one receiver; wherein
the at least one power amplifier is provisioned to receive demodulator output of at least one demodulator;
the at least one demodulator is provisioned to receive bandpass filter output of a bandpass filter;
the bandpass filter is provisioned to receive output of the at least one transducer;
the external device comprises a second device with at least one second device ADC (analog to digital converter), at least one second device digital signal processor, at least one second device DAC (digital to analog converter) and at least one second device modem, the second device further comprising:
at least one second device transducer connected at least one second device bandpass filter;
at least one second device demodulator connected to the at least one second device bandpass filter;
the at least one second device ADC connected to the at least one second device demodulator;
the at least one digital signal processor being connected to the at least one second device ADC and the at least one second device DAC;
the at least one second device DAC provisioned to receive input from the at least one second device digital signal processor;
at least one second device modulator provisioned to receive input from the at least one second device DAC;
the at least one second device transducer being provisioned to receive the input from the second modulator;
wherein the first device modulates at least one microphone signal on to the RF channel, the second device demodulates at least one signal from the RF channel, the second device further processes at least one demodulated signal to create a processed signal including the enhanced audio signal, the second device modulates the processed signal on the RF channel, and the interface of first device demodulates the processed signal from the RF channel and renders the enhanced audio signal on the at least one receiver.

2. The device of claim 1, wherein the hearing transducer device consists of analog circuitry.

3. The device of claim 1, wherein the interface comprises a wireless interface.

4. The system of claim 1, wherein the external device comprises a smartphone.

5. The system of claim 4, wherein the smartphone comprises software to present a foreground acoustic source selection interface to the user.

6. The system of claim 5, wherein the acoustic source selection interface comprises a grid with representations of acoustic sources in a surrounding environment.

7. The system of claim 4, wherein the smartphone comprises software to present a self-adjustment interface to the user.

8. The system of claim 1, wherein the external device comprises a unit configured to be worn on the body of a user.

9. The system of claim 8, wherein the external device comprises a communication interface to communicate with one of a smart phone, smart watch, or smart pendant.

10. The device of claim 1, wherein the second device at least one digital signal processor is provisioned to perform 3D audio scene analysis.

11. The device of claim 1, wherein the second device at least one digital signal processor is provisioned to classify foreground and background sound classification.

12. The device of claim 1, wherein the second device at least one digital signal processor is provisioned to remix foreground and background sounds with different intensities.

13. The device of claim 1, wherein the second device at least one digital signal processor is provisioned to modify at least one foreground sound to compensate for a given hearing loss characteristic.

14. The device of claim 1, wherein the second device comprises at least one wireless modem paired to at least one modem of a third device, wherein the third device is provisioned to connect to the Internet wirelessly.

15. The device of claim 1, wherein the second device at least one digital signal processor is provisioned to receive at least one hearing loss characteristic, corresponding to at least one listening environment from a third device.

16. The device of claim 1, wherein the second device is configured to render pure tone audiometry stimuli in the first device and further comprising an interface to receive user input in response to the stimuli.

17. The device of claim 1 configured to modify at least one hearing loss characteristic based on at least one user response to at least one test stimulus.

18. The device of claim 1, wherein the second device at least one digital signal processor is provisioned to receive sound signals from multiple sources and for mixing in with foreground and background sounds.

19. The device of claim 1, wherein the second device at least one digital signal processor is provisioned to turn off all sound delivery.

\* \* \* \* \*

UNITED STATES PATENT AND TRADEMARK OFFICE
CERTIFICATE OF CORRECTION

PATENT NO. : 10,701,495 B2
APPLICATION NO. : 15/502130
DATED : June 30, 2020
INVENTOR(S) : Nguyen et al.

Page 1 of 1

It is certified that error appears in the above-identified patent and that said Letters Patent is hereby corrected as shown below:

In the Specification

In Column 1, Line 13, please add the following:
STATEMENT OF GOVERNMENT INTEREST
This invention was made with government support under DC015046 awarded by the National Institutes of Health. The government has certain rights in the invention.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*